United States Patent Office
3,524,659
Patented Aug. 18, 1970

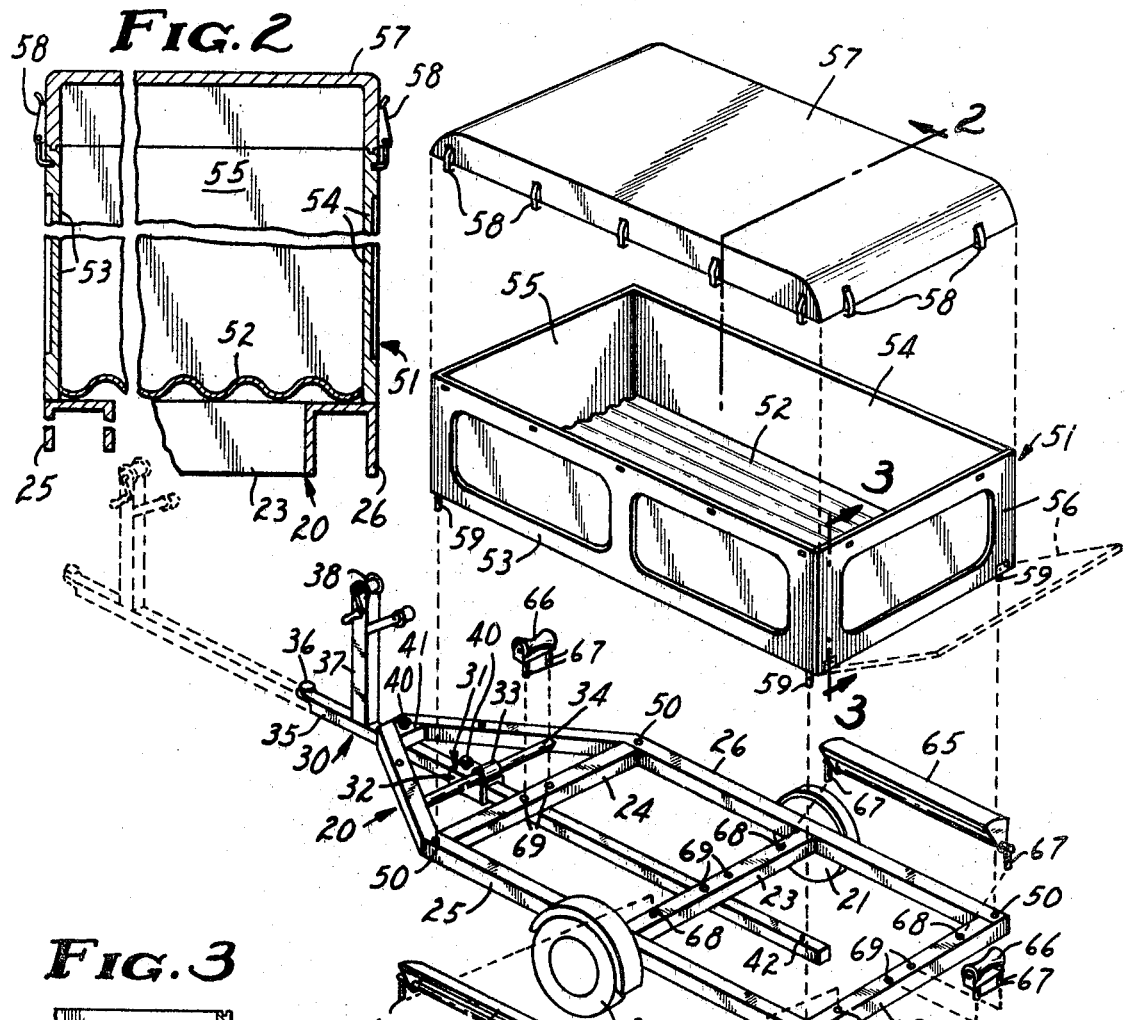

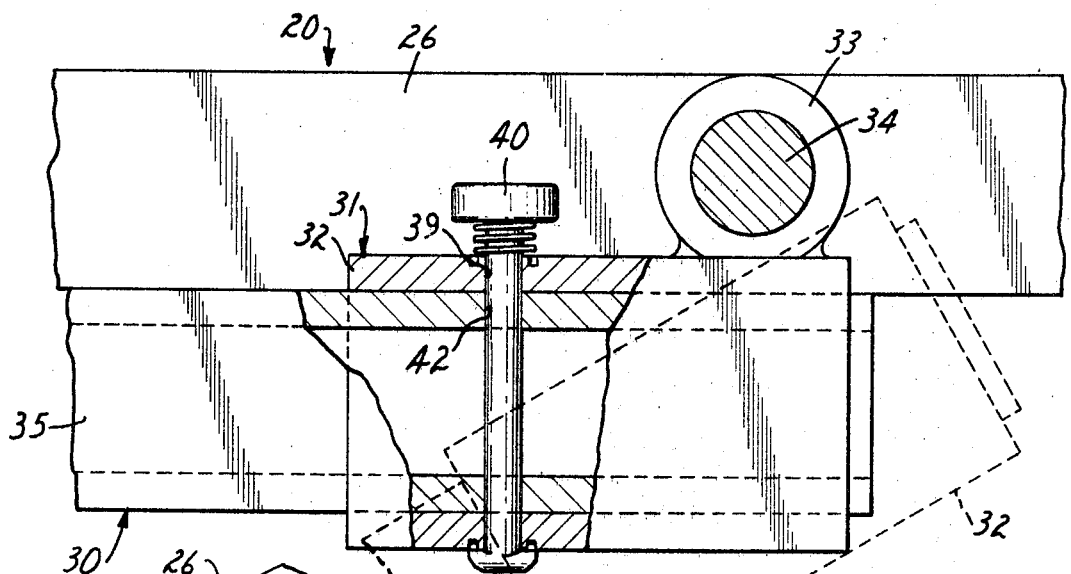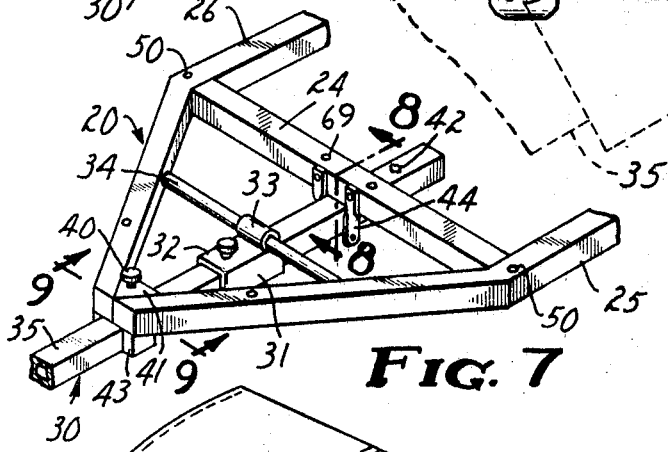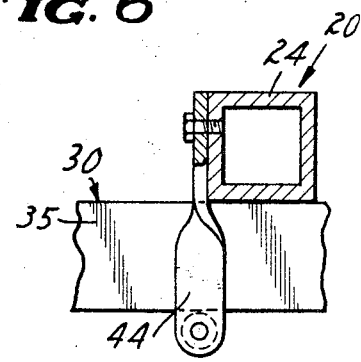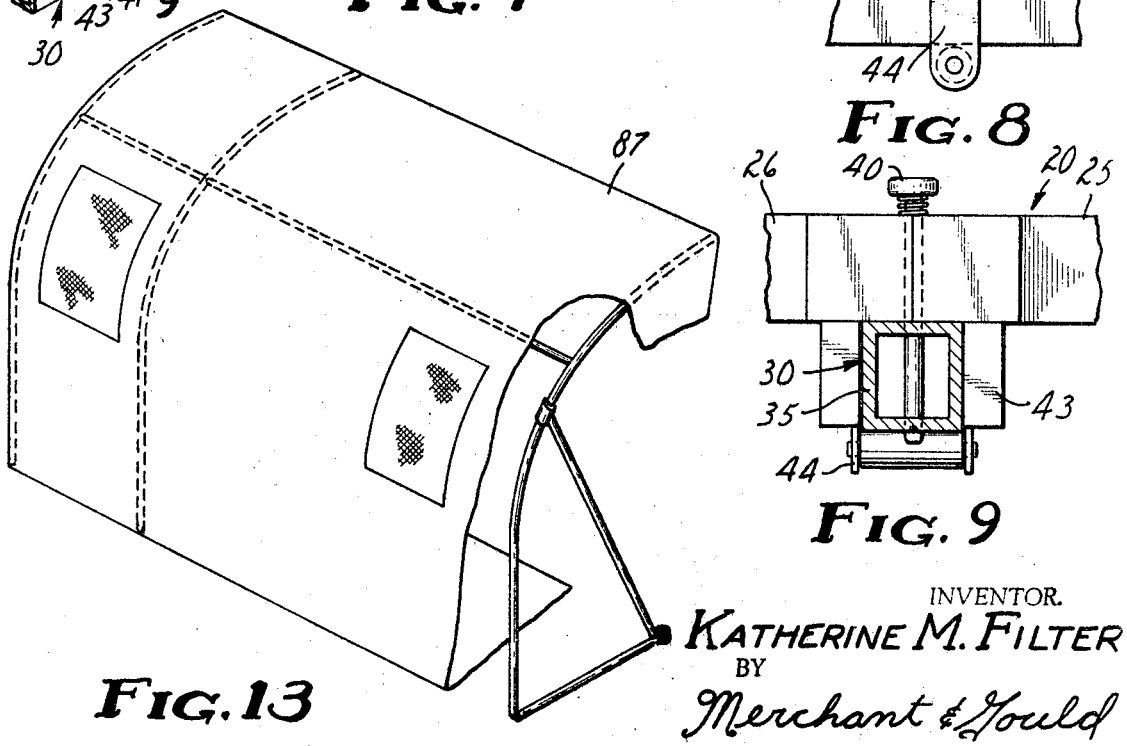

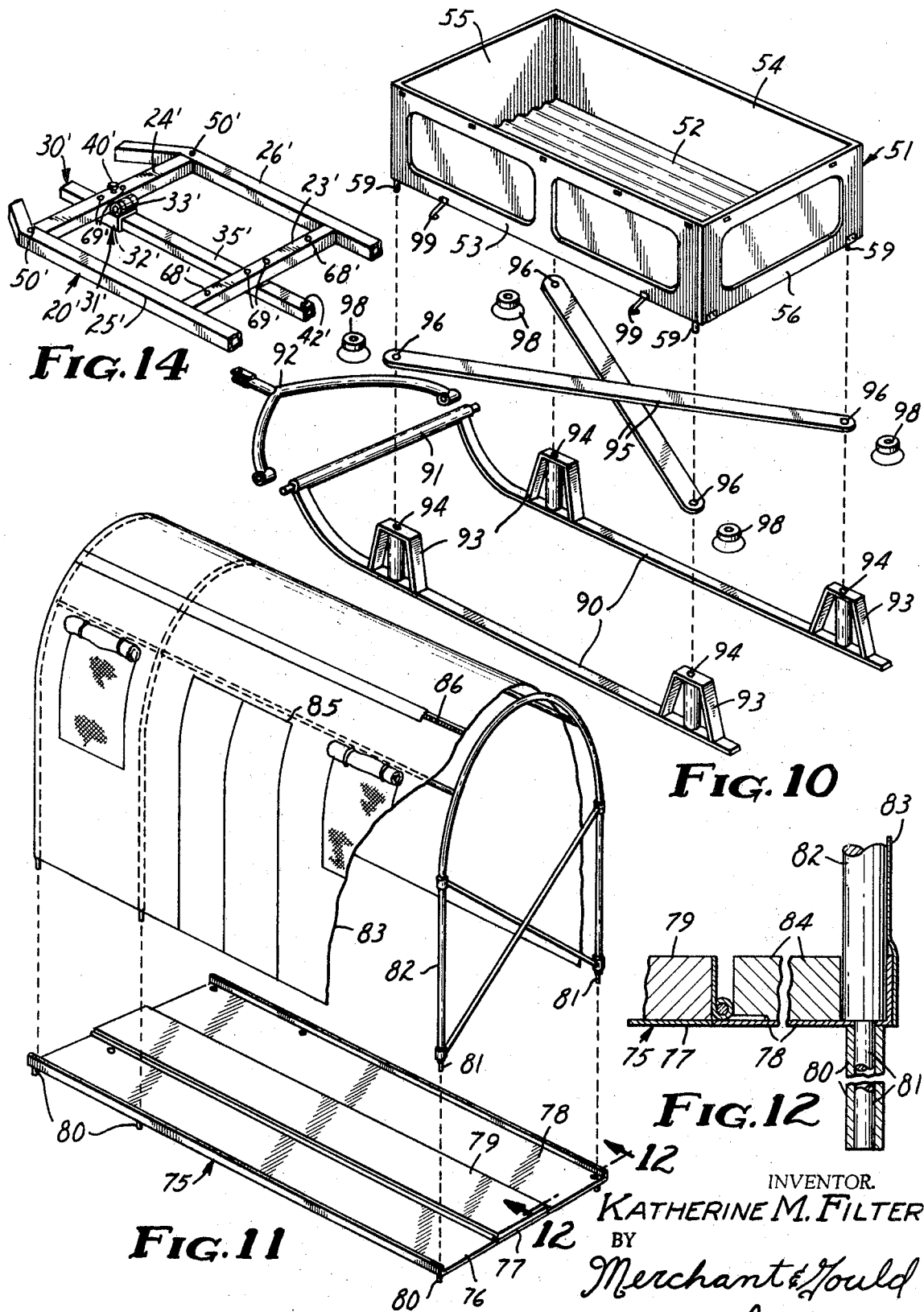

1

3,524,659
MULTI-PURPOSE TRANSPORTATION APPARATUS
Katherine M. Filter, 3910 Aldrich Ave. S.,
Minneapolis, Minn. 55403
Filed Apr. 15, 1968, Ser. No. 721,292
Int. Cl. B62d 53/00; B60p 3/42
U.S. Cl. 280—414
1 Claim

ABSTRACT OF THE DISCLOSURE

Interchangeable transportation apparatus for carrying substantially any type of load, including a wheeled frame having holes therein, and a trailer box having downwardly projecting dowels attached thereto and adapted to mate in the holes of the frame and lock therein to hold the box fixedly in position. Additionally the box is interchangeable with, or may include, a cradle for carrying boats and a flat bed having tent means mountable thereon. Also, the wheeled frame may be exchanged with a frame having sled runners thereon and the box is mountable on the top of an automobile with suction cups.

BACKGROUND OF THE INVENTION

Field of the invention

In transportation devices adapted to be attached to automobiles or the like it is often advantageous to be able to modify the device for various loads and ground conditions. To reduce expense and the amount of work required the modifications should be convenient and simple to perform.

Description of the prior art

In the prior art many multi-purpose units are described which may be utilized for transportation, living space, etc. In all of these prior art devices the entire device is contained in a single unit and the various parts are moved into an operating position while other parts are moved into a storage position. Thus, many parts are simply hanging on the device in a storage position and add extra weight as well as normally being in an inconvenient and awkward position. Many of these devices are extremely complicated to operate and are unreliable since the great wealth of parts attached thereto have a tendency to become loosened during non-use.

SUMMARY OF THE INVENTION

The present invention is a multi-purpose transportation apparatus which includes a mobile frame having a plurality of spaced apart vertical apertures extending therethrough and adjustable draft means attached to one end thereof and an interchangeable load receiving means having downwardly extending dowels fixedly attached thereto and engaged in the apertures with locking means associated therewith for maintaining the dowels fixedly engaged in the apertures to hold the load receiving means fixedly attached to the frame.

It is an object of the present invention to provide a new and improved multi-purpose transportation apparatus.

It is a further object of the present invention to provide transportation apparatus easily adaptable to substantially any type of load or purpose and to various types of ground conditions.

These and other objects of this invention will become apparent to those skilled in the art upon consideration of the accompanying specification, claims, and drawings.

BRIEF DESCRIPTION OF THE DRAWINGS

Referring to the drawings, wherein like characters indicate like parts throughout the figures:

2

FIG. 1 is an exploded view in perspective illustrating the present invention with a wheeled frame and the position of two interchangeable load receiving means thereon;

FIG. 2 is an enlarged sectional view as seen from the line 2—2 in FIG. 1 with one of the interchangeable load receiving means mounted on the mobile frame, parts thereof broken away;

FIG. 3 is an enlarged sectional view as seen from the line 3—3 in FIG. 1, parts thereof broken away;

FIG. 4 is a sectional view as seen from the line 4—4 in FIG. 3, parts thereof broken away;

FIG. 5 is an enlarged detailed view in top plan of the adjustable draft means with the locking pins removed, parts thereof broken away;

FIG. 6 is an enlarged view in side elevation as seen from the line 6—6 in FIG. 5, parts thereof removed and shown in section and parts thereof broken away;

FIG. 7 is a view in perspective of the front portion of the wheeled mobile frame, parts thereof broken away;

FIG. 8 is an enlarged sectional view as seen from the line 8—8 in FIG. 7, parts thereof broken away;

FIG. 9 is an enlarged sectional view as seen from the line 9—9 in FIG. 7;

FIG. 10 is an exploded view in perspective of the relationship of the interchangeable load receiving means and a mobile frame having runners thereon;

FIG. 11 is an exploded view in perspective of the relationship of a shelter to another interchangeable load receiving means, parts thereof broken away;

FIG. 12 is a sectional view as seen from the line 12—12 in FIG. 11, parts thereof broken away;

FIG. 13 is a view in perspective of additional shelter means adapted to be connected to the shelter means of FIG. 11, parts thereof broken away; and FIG. 14 is a view similar to FIG. 1, parts thereof removed, of a different embodiment.

DESCRIPTION OF THE PREFERRED EMBODIMENTS

In the figures the numeral 20 generally designates a mobile frame having wheels 21 rotatably attached at either side thereof for movement over the ground. The frame 20 includes three cross beams 22, 23 and 24 joined at either end by longitudinal beams 25 and 26. The forward ends of the longitudinal beams 25 and 26 are bent so as to taper gradually together at the extreme forward end thereof. It should be understood that the frame 20 could be constructed in a variety of ways well known to those skilled in the art and the present embodiment is illustrated simply for exemplary purposes.

A draft means, generally designated 30, includes a housing 31 (see FIGS. 1, 5 and 6) formed from a tubular member 32 having an opening therethrough with a generally rectangular shaped cross section and a second tubular member 33 with an opening therethrough having a circular cross section fixedly attached to the tubular member 32 by welding or the like so that the longitudinal axes thereof are perpendicular. The housing 31 is pivotally mounted on the frame 20 by means of a rod 34 engaged through the tubular member 33 and attached at either end to the longitudinal beams 25 and 26 of the frame 20 so as to be positioned between the tapering portions thereof. Thus, the tubular member 32 is rotatable about an axis perpendicular to the direction of movement of the frame 20 with the longitudinal axis thereof parallel with the direction of movement of the frame 20.

An elongated bar 35 is slidably engaged in the opening of the tubular member 32 for sliding movements along the longitudinal axis thereof. The bar 35 has a hitch 36 fixedly attached thereto adjacent the forward end and an upstanding bar 37 attached adjacent the hitch 36 with a windlass 38 attached to the upper end thereof. The tubular member 32 of the housing 31 has an opening 39 therethrough adapted to receive a spring loaded bayonet-styled draw pin 40 (see FIG. 6). While the pin 40 is engaged in the opening 39 from the top downwardly, in the illustrations, it should be noted that opening 39 is constructed so that the pin 40 can be inserted from the bottom upwardly when the load is such as to interfere with the operation thereof. A fillet 41 between the converging ends of the longitudinal beams 25 and 26 also has an opening therethrough with a bayonet-styled draw pin 40 engaged therein. The bar 35 has openings 42 therealong into which the bayonet-styled draw pins 40 are inserted to prevent the bar 35 from sliding longitudinally. The openings 42 in the bar 35 are situated so that the bar 35 is maintained in a first or operating position, as illustrated in FIG. 1, or in a second or tiltable position, as illustrated in FIG. 6. Pairs of generally vertical guide members 43 and 44 are atached at the front ends of the longitudinal beams 25 and 26 and the mid-section of the cross beams 24, respectively (a pair of guide members, not shown, are also attached at the mid-section of the cross beam 23), to guide the bar 35 during sliding movements thereof (see FIGS. 8 and 9).

Referring to FIG. 14 a slightly different embodiment of the frame 20 is illustrated wherein parts similar to those in the embodiment illustrated in FIG. 1 are designated with similar numerals having a prime added to indicate the different embodiment. In this embodiment the housing 31' is pivotally attached to the rear surface of the cross beam 24' by means of a hinge 33'. The pin 40' is engaged through the cross beam 24' and the housing 31' to prevent longitudinal movement of the bar 35' and/or pivotal movement of the housing 31' while the pin 40' is engaged therethrough. To tilt the frame 20' downwardly the pin 40' is removed from engagement through the cross beam 24' and is engaged through a hole 42', thereby, limiting the longitudinal movement of the bar 35'. The bar 35' is then slid longitudinally through the housing 31' until the pin 40' strikes the rear edges thereof at which time the trailer is free to pivot.

The frame 20 has four holes 50 therethrough, one being at each rear corner adjacent the junction of the cross beam 22 and the longitudinal beams 25 and 26 and one being adjacent each of the junctions of the cross beam 24 with the longitudinal beams 25 and 26. An interchangeable load receiving means, which in this instance is a box 51, is adapted to fit on the frame 20 in the following manner. The box 51 includes a bottom 52 formed of corrugated sheet metal or the like, two vertical sides 53 and 54, fixedly attached to the bottom 52, a vertical front end 55 fixedly attached to the bottom 52 and the sides 53 and 54, and a vertical rear end 56 hingedly attached to the bottom 52 to provide a convenient means for loading and unloading the box 51. A top or cover 57 is adapted to fit in engagement with the upper edges of the sides 53 and 54 and the ends 55 and 56 and is removably engaged thereon by a plurality of cam-acting clips 58. Four dowels 59 are fixedly attached in downwardly extending relationship to the bottom surface of the bottom 52, as illustrated in FIG. 4, at each of the four corners thereof so as to mate with the holes 50 in the frame 20 when the box 51 is properly positioned thereon. Each of the dowels 59 extends downwardly a sufficient distance to pass through the frame 20 and a transverse hole 60 (see FIGS. 3 and 4) is formed therein to receive a cotter pin 61 therethrough. The dowels 59 and the cotter pin 61 hold the box 51 fixedly engaged on the frame 20 while rendering it quickly and easily interchangeable with other load receiving means to be explained presently. It should be understood that the cotter pins 61 are illustrated for exemplary purposes and other locking means might be utilized therewith.

A second interchangeable load receiving means includes a pair of fenders 65 and a pair of rollers 66, each having a dowel 67 at each end thereof. The cross beam 22 has a hole 68 adjacent either end thereof adapted to receive one of the dowels 67 attached to the ends of the fenders 65 and the cross beam 23 has two holes 68 adjacent either end thereof adapted to receive the dowel 67 adjacent the other end of each of the fenders 65. Thus, the two fenders 65 are mounted in a horizontal spaced apart relationship so as to extend in the direction of movement of the frame 20. A pair of holes 69, spaced apart a sufficient distance to receive the two dowels 67 on one of the rollers 66 are formed in the cross beam 22 at approximately the mid-section thereof. A similar pair of holes 69 are formed in the cross beam 24 for receiving the second roller 66 therein. A similar pair of holes 69 are formed in the cross beam 23, and, although a third roller 66 is not shown, one may be inserted therein or one of the other rollers 66 may be utilized therein. Each of the dowels 67 is of sufficient length to extend through the frame 20 and has a hole and cotter pin (not shown) therethrough to lock the load receiving means on the frame 20. Thus, the fender 65 and the rollers 66 form a cradle on the frame 20 for receiving a boat or the like therein.

A third interchangeable load receiving means is illustrated in FIG. 11 and includes a relatively flat bed 75 adapted to fit on the frame 20 interchangeably with the box 51 or the cradle. The flat bed 75 includes three elongated relatively flat pieces 76 through 78 positioned in side-by-side relationship and hingedly connected together at adjacent sides (see FIG. 12) to form the flat bed 75 and having a width and length approximately equal to the bottom of the box 51. The outermost side edges of the pieces 76 and 78 are flanged upwardly to form tread rails, between the hinges and the flanges, adapted to receive snowmobile treads, sled runners, small automobile tires and the like thereon with substantially no transverse slippage.

A board 79 is affixed in overlying relationship to the center piece 77 of the flat bed 75 to aid in forming the sides of the tread rails and preventing transverse slippage of loads carried on the flat bed 75. The flat bed 75 has downwardly extending dowels 80 attached to the under surface thereof for engagement in the holes 50 of the frame 20 to engage the flat bed 75 on the frame 20. In this embodiment the dowels 80 are hollow and adapted to receive a pin 81 therein (see FIG. 12). Pins 81 are attached to the lower ends of hoops 82 which form a framework for a tent 83 adapted to be positioned on the flat bed 75. When the flat bed 75 is utilized as a floor for the tent 83 additional boards 84 are placed in overlying relationship on the pieces 76 and 78 to form a relatively flat surface. The tent 83 may be utilized on the flat bed 75 when the flat bed 75 is mounted on the mobile frame or with the flat bed 75 simply resting on the ground. The tent 83 has doors 85 on either side thereof and a zipper 86 extending longitudinally the length of the tent 83 above either of the doors 85. The zippers 86 are utilized to attach a room 87 on either side of the tent 83. The rooms 87 are constructed in a fashion similar to the tents 83 except that they are approximately one-half the size thereof.

In the exent that the ground conditions or the particular application are such that the wheeled frame 20 cannot be utilized, a pair of sled runners 90 are provided, which sled runners 90 are connected in spaced apart relationship by a rod 91 extending between the upturned tips thereof. A draft means 92 is pivotally attached at either end of the rod 91 for moving the sled runners 90 across the ground. The draft means 92 is illustrated as a simple Y-shaped device but it should be understood that it might be adjustable in length or height and many other modifications might be provided by those skilled in the art.

Each of the sled runners 90 has a pair of vertically upwardly extending braces 93 fixedly attached thereto in spaced apart relationship. The braces 93 have holes 94 therethrough adapted to receive the dowels 59 of the box 51 or the dowels 80 of the flat bed 75. To reinforce the sled runners 90 and add transverse strength thereto, a pair of elongated braces 95 having holes 96 adjacent each end thereof are constructed to extend between the front brace 93 of the first sled runner 90 and the rear brace 93 of the second sled runner 90 and between the first brace 93 of the second sled runner 90 and the second brace 93 of the first sled runner 90. Thus, the braces 95 form a cross which prevents relative transverse movement of the sled runners 90 and underlies the load receiving means to add additional strength thereto.

In some instances it may be desirable to utilize the box 51 or the flat bed 75 as a car top carrier and toward this end four suction cups 98 are provided which mate with the dowels 59 or 80, with the additional bracing effect of the braces 95 if desired, to hold the load receiving means spaced from the top of the automobile. Hooks 99 are fixedly attached to the sides of the load receiving means (see FIG. 10) to engage the eaves of the automobile top and hold the load receiving means fixedly in place thereon.

Thus, multi-purpose transportation apparatus has been disclosed having conveniently interchangeable load receiving means thereon and adapted for a plurality of uses. In each case the overall apparatus is light and easy to use because additional unused equipment is not depending therefrom.

While I have shown and described a specific embodiment of this invention, further modifications and improvements will occur to those skilled in the art.

What is claimed is:
1. Multi-purpose transportation apparatus comprising:
 (a) a mobile frame having a plurality of spaced apart, vertical apertures extending therethrough;
 (b) adjustable draft means attached to said frame;
 (c) interchangeable load receiving means having fixedly attached thereto a plurality of downwardly extending dowels engaged in a plurality of said apertures and extending beyond the lower edge of each of said apertures with said load receiving means resting on said mobile frame; and
 (d) each of said dowels having means associated therewith for locking said dowels in said apertures and preventing inadvertent removal thereof; wherein the adjustable draft means includes an elongated bar having a hitch adjacent one end, a housing pivotally attached to the mobile frame for movement about an axis transverse to the direction of movement and an opening therethrough positioned in underlying relationship with said frame extending in the direction of movement and adapted to slidably receive said bar therein, and locking means to prevent relative sliding movements between said bar and said housing at predetermined positions, said housing being attached to said mobile frame so that said mobile frame interferes with said bar to prevent relative rotation when said bar is in a frame-underlying position and the rear of said mobile frame being free to rotate downwardly relative to said bar when said bar is in the extended position.

References Cited
UNITED STATES PATENTS

| | | | |
|---|---|---|---|
| 3,097,755 | 7/1963 | Fulcher | 280—414 |
| 3,102,649 | 9/1963 | Whalen | 280—478 |
| 3,266,836 | 8/1966 | Taylor | 280—414 |

BENJAMIN HERSH, Primary Examiner

R. R. SONG, Assistant Examiner

U.S. Cl. X.R.

280—482; 296—10